July 6, 1948. P. P. HORNI 2,444,508
ELECTRIC HEATER FOR FLOWING FLUID
Filed Oct. 29, 1945 4 Sheets-Sheet 1

PAUL P. HORNI
INVENTOR

July 6, 1948.   P. P. HORNI   2,444,508
ELECTRIC HEATER FOR FLOWING FLUID
Filed Oct. 29, 1945   4 Sheets-Sheet 2

PAUL P. HORNI
INVENTOR

BY C. F. Wm. Forssberg
ATTORNEY.

July 6, 1948.  P. P. HORNI  2,444,508
ELECTRIC HEATER FOR FLOWING FLUID
Filed Oct. 29, 1945  4 Sheets-Sheet 3

PAUL P. HORNI
INVENTOR

BY C. F. Wm Forssberg
ATTORNEY.

July 6, 1948.  P. P. HORNI  2,444,508
ELECTRIC HEATER FOR FLOWING FLUID
Filed Oct. 29, 1945  4 Sheets—Sheet 4

PAUL P. HORNI
INVENTOR

BY C.F.Wm. Forssberg
ATTORNEY.

Patented July 6, 1948

2,444,508

UNITED STATES PATENT OFFICE 2,444,508

ELECTRIC HEATER FOR FLOWING FLUID

Paul P. Horni, New York, N. Y.

Application October 29, 1945, Serial No. 625,204

14 Claims. (Cl. 219—40)

1

This invention relates to electric fluid heaters wherein the fluid is caused to flow through the same in direct contact with a plurality of electrically conducting plates, one form of heater being adapted to be connected to a faucet and another form capable of being directly connected into the water line, while both forms are provided with means for introducing or cutting out one or more of the plates in the circuit.

The main object of my invention is to produce an electric water heater which is adapted for attachment to the water faucet in the domestic kitchen or to the pipe leading to the faucet, making it unnecessary to have more than the one faucet and also making it a matter of choice to have hot or cold water issuing from the same.

Another object is to have the heater equipped with adjustment means for increasing or decreasing the active plate surface in contact with the water in order to adjust the electric current passing through the water to compensate for various degrees of resistance according to the region from which the water comes, and thereby obtain a uniform heating of the water flowing through the device.

A further object is to provide a heater of the character indicated with a double cover so that the uppermost cover may be raised or removed to give access to an adjusting screw or the like for adjusting the number of plates within the device in active connection with the circuit, and to protect the connections of the electric cable to the binding posts upon the inner cover.

It is also an object to provide at least one form of the device with an automatically operated switch for closing the circuit when the water starts to flow through said device and to cut off the current promptly upon cessation of the flow to avoid overheating.

It is likewise an object to include in one form of the heater a further automatically operated cutout switch for cutting off the current when a predetermined temperature has been reached in the water flowing through in order to prevent steam generation and accidents.

Other objects and advantages will appear in detail as this specification proceeds, due reference being had to the accompanying drawings forming part hereof, and in which Fig. 1 is a top plan view of an electric water heater made according to certain of the principles of the invention and adapted for connection to a kitchen faucet;

Fig. 2 is a vertical section of the heater as taken on line 2—2 in Fig. 1;

2

Fig. 3 is another vertical section taken on line 3—3 in Fig. 4, Fig. 4 being a top plan view similar to that disclosed in Fig. 1 with the upper cover removed;

Fig. 5 is also a top plan view when both covers are removed;

Fig. 6 is a plan view of a plate of the heater shown in the previous views;

Fig. 17 is a plan view of one of the two contact members of Fig. 15, Fig. 18 showing the other side of the same member; while

Throughout the views, the same references indicate the same or like parts.

In many households, hot water is not ordinarily available at the kitchen or wash stand faucets except in some cases where in the winter the heating of a kitchen stove also effects the heating of a boiler associated therewith. This condition is often true in the large cities of this and even other countries, so that the so-called cold water dwellings are very numerous in the aggregate.

It is now proposed to remedy this lack of hot water supply and also to simplify the supply of hot water in places where the latter is actually available after a fashion, by providing an electric water heater which may be used to heat the water issuing from the faucet or flowing toward the faucet so as to issue already heated. Certain novel features and effective facilities are included in the construction of the heater enabling the person installing the same to adjust said heater for heating any type of water according to its resistance to the electric current and obtain water heated to any predetermined temperature.

Hence, with the foregoing objects in view, and referring again to the drawings, in the practice of my invention, a heater casing, generally indicated at 22 is preferably made of insulating material such as a suitable plastic capable of withstanding the effects of heat and water, or a ceramic, and inserting into said casing a stack of electrically conducting plates 23, 24, etc., which may be of stainless steel, plated metal or even carbon, if desired. These plates are retained assembled in the stack by first attaching them in proper alternation to a plurality of binding posts 25, 25, 26, 26 fixed in an insulating cover 27, this cover being then placed in position upon a resilient gasket 28 with the plate stack depending therefrom down into the casing and securing the cover in place by means of a group of marginal screws 30, 30. Thereafter, an outer or upper cover 29 is placed over the inner cover just described and in turn secured to the latter by a central group of screws 31 surrounding a central flange 32 which serves to retain a flexible faucet nipple 33 by its lower end flange 34 being held thereunder. This nipple is preferably made of rubber or resilient plastic and terminates above in a thin re-entrant portion 35 adapted to engage about a faucet (not shown) and effectively grip the same when water under pressure flows through said nipple. In one form of the latter, the upright portion above the flange may be of more or less hard or semi-hard rubber and the re-entrant portion of softer and resilient rubber capable of changing its shape to suit various faucets.

The actual form of the nipple may vary according to requirements, but it is usually desirable that it be caused to grip the faucet automatically when the water within exerts pressure about the re-entrant portion actually in contact with the faucet and thereby causes said portion to hold tightly about the fauset so as to prevent leakage of water at the upper portion of the heater.

Beneath the retaining flange 34 just alluded to is recessed a strainer structure 36 adapted to strain out rust and dirt from the water entering the apparatus, said strainer structure being removable for cleaning or renewal when the outer cover is removed from off the lower or first cover. Such removal of the outer cover also provides access to the upper terminals of the binding posts to which the plates are secured for attaching the inner ends of the current supply cable 37 and also allowing direct adjustment of the contact adjusting screw 38 as will now be noted in connection with the mounting of the heating plates.

The binding posts 25, 25 are of the same polarity and support plates 23 at diametrically opposite points, these plates being arranged in alternation with plates 24 supported by posts 26, 26 of different polarity than posts 25, plates 23 having the opposite cut out portions 39, 39 to avoid contact with posts 26, 26 and plates 24 similarly having cutout portions 40, 40 to avoid contact with posts 25, 25. The uppermost plate 41 also has cutout portions 40 to avoid contact with said posts 25 and has one end extending over a crescent shaped recess 42 in the heater casing 22 forming a distributing chamber for the water descending from the nipple 33 through aperture 43 in cover 27 and traveling over plate 41 by way of passage 44 connecting with vertical well 45 in the casing. The latter communicates with chamber or recess 42 through vertical slot 46 to regulate the amount of water which may enter chamber 42 from said well. While posts 25 support plates 23, the latter are actually insulated from the same by insulating sleeves 46', 46', which is likewise true of plate 47 immediately above bottom plate 67, only the top plate 41 being actually in electrical contact with said posts. In said top plate is an adjustable contact screw 38 fitting a thread therein and extending down to a contact pin 48 in plate 23 and in this manner makes electrical contact with said plate 23. When the adjusting screw is unscrewed so that its head points to index 0 in Fig. 4, the contact will be broken and plate 23 will be out of the circuit and inactive, but when the screw is turned to index 1, the uppermost plate 23 will have its pin 48 engaged in contact with the adjusting screw by a slight descent of the lower end of the latter. Each contact pin upon plates 23 is secured in the outer end of a flexible tongue 49 in each case integral with the plate with which it is associated. Upon turning the screw further to index 2, the uppermost tongue 49 will be bent down just sufficiently to bring its contact pin into contact with the corresponding contact pin in the tongue of the next plate 23 below, bringing not only the uppermost plate 23 but also the next similar plate into the circuit in parallel with top plate 41 which is directly connected to posts 25. If the screw is turned to indices 3 or 4, the third or fourth plates are added to the circuit in similar fashion for water of higher resistance. In order to avoid short-circuiting the plates of opposite polarity when thus adjusting screw 38, the alternate plates 24 are provided with cutout clearance slots 50 which allow the tongues 49 to bend down under pressure from screw 38 without making contact with plates 24.

When the lowest plate 23 is also included in the circuit of the top plate 41 and posts 25, and the screw 38 turned even further, the lowest pin 48 will make contact with plate 47 and thereby add the latter to the plates in the circuit with said top plate. Thus, three plates 23 and plate 47 can be added one by one at will to increase the surface in contact with the water with the same polarity with the mentioned plate 41, and hence, it is possible by merely turning the adjusting screw to the proper index to adjust the apparatus for heating water of any variation in resistance according to the locality from which the water originates. It may be noted at this point that all of the plates 24 are directly secured mechanically and electrically to posts 26, 26, the only plates capable of variation with respect to the heating circuit being the previously described plates 23 with their tongues 49 and the contact pins 48. With the posts 25 and 26, plates 23, 24, 41 and 47, etc., constitute a unit with the inner or lower cover 27 so as to be removable therewith from casing 22 for cleaning and removal of deposits from the plates which may have accumulated after a period of service. For this purpose, removal of the upper screws 31 and outer cover 29 and then release of marginal anchoring screws 30 will allow the inner cover 27 to be raised with the plates and posts from the casing.

In order to provide a proper outlet from the heater for the hot water, the water entering the main heating chamber 51 occupied by the heating plates from well 45 through equalizing slot 46 passes between the various adjacent plates to the extension 52 of said heating chamber and then down through the settling well 53 up through rising passage 54 separated from chamber extension 52 by partition 55 and thence across the upper end of partition 56 down through outlet passage 57 and finally out through spout 58 and its perforate plate 59. The passage 52, 54 and 57 virtually constitutes a syphon, and in order to liberate any gases which may tend to develop during heating of the water in the upper portion of chamber extension 52, a narrow tube 60 opens into said upper portion through partition 55 and passing over partition 56 descends through outlet passage 57 down through plate 59 at which point it opens into the atmosphere. The water passing down about said tube through spout 58 and plate 59 produces a suction in the lower end of said tube 60 and thereby exhausts all air or gases from the syphon which would otherwise tend to partially block the flow of the heated water toward the spout.

In following the operation of the heater, it may be noted that electric current may be supplied thereto from the house mains by inserting plug 61 (Fig. 20) into a socket or otherwise connecting the cable 37 to the lighting circuit, also including a switch 62, if desired. If the faucet (not shown) is turned on to start the water flowing through the heater and switch 62 closed, the plates previously described will pass the current through the water between the adjacent plates, the resistance of the water causing the water to heat rapidly while flowing through. The water enters nipple 33, passes down through screen 36 into vertical passage 43 and then through horizontal passage 44 to descend into well 45, whence it passes through equalizing slot 46 into the end portion 42 of the heating chamber. In the latter, the water proceeds between the plates to chamber portion 52, down past well 53 and sweeps upward through passage 54 then down passage 57 and out through plate 59 in nozzle 58 in hot condition. Any water that may seep through tube 60 with the flow issuing from the nozzle or spout will be heated so as to be of the same temperature as the water surrounding the tube, resulting in an issuing multiple stream of hot water.

Figures 1, 2, 3, 4, 5, 6:
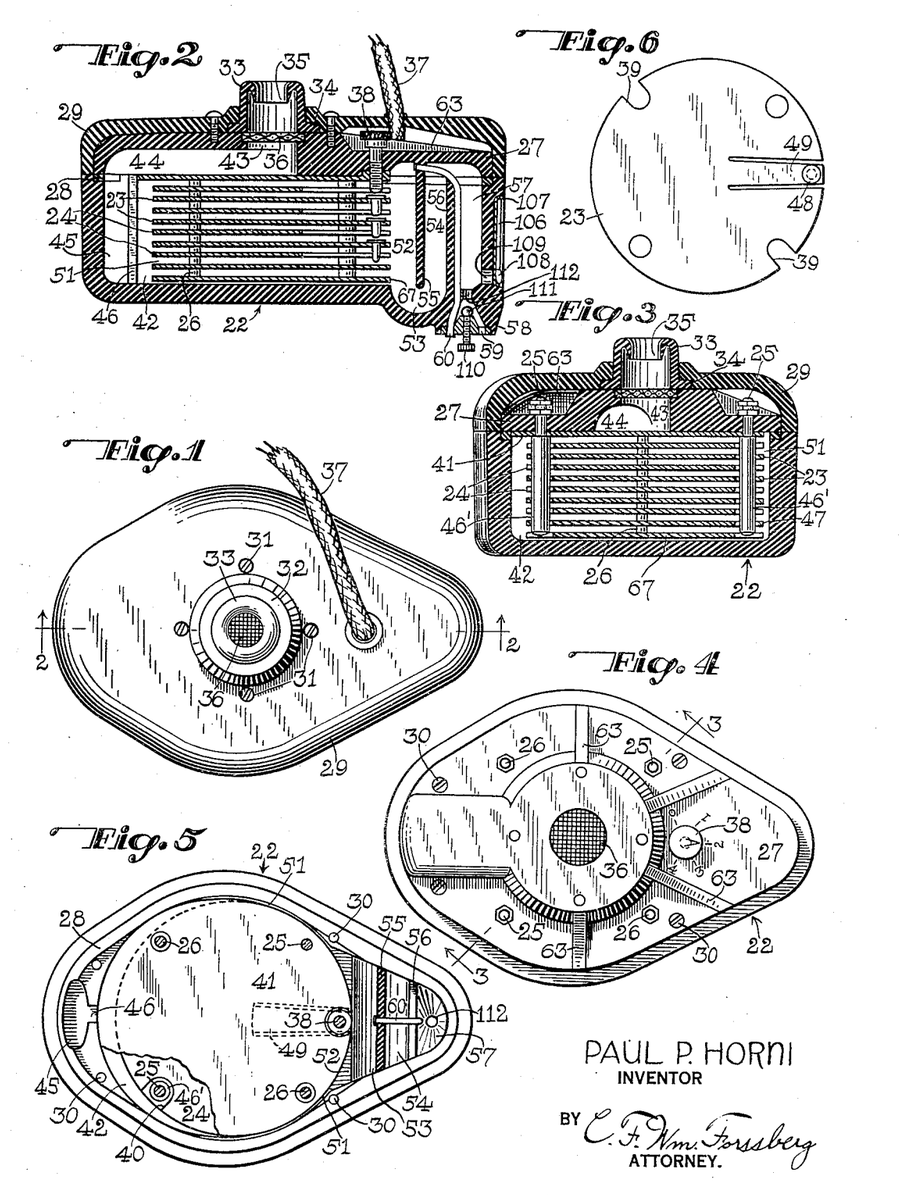
Figure 20:
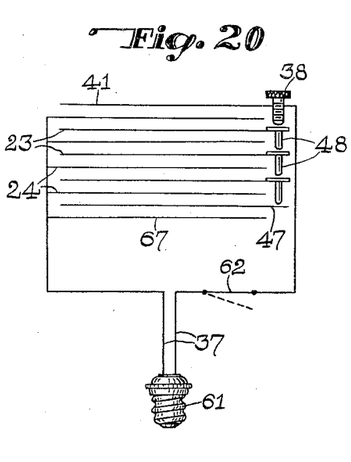
Fig. 20 is a circuit diagram of the heater of Figs. 1 to 5.

The diagram in Fig. 20 shows the circuit of the heater in simple form, but in reference to Figs. 1, 2 and 4, it should be noted that the two conductors of cable 37 may be individually connected to either one of binding posts 25 on the one hand, beneath outer cover 29, and on the other hand to either of posts 26. The reinforcing ribs 63 on the inner cover serve not only to stiffen and strengthen the same but also to provide between them sufficient spaces for the upper terminals of the binding posts and for making the cable connections thereto beneath the outer cover, and also for accommodating adjusting screw 38.

Figure 7:
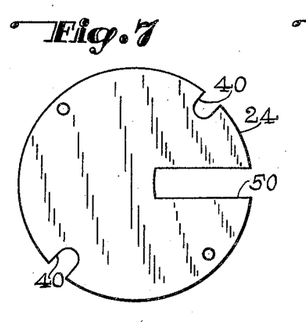
Fig. 7 is a similar view of another plate of the group enclosed within the heater, being of different polarity than that of Fig. 6.
Figure 8:
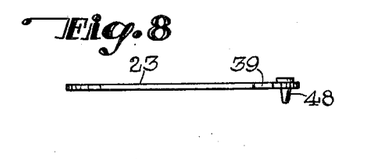
Fig. 8 is a side elevation of the plate shown in Fig. 6.
Figure 9:
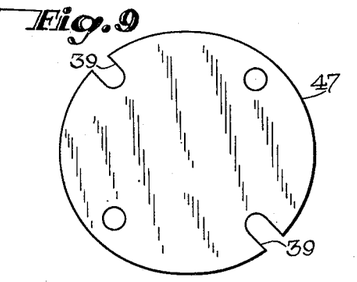
Fig. 9 is a plan view of the bottom plate of the heater shown.
Figure 10:
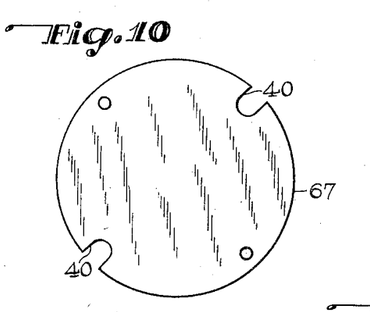
Fig. 10 is also a plan view of the plate immediately above that shown in Fig. 9 when they are in place in the heater.
Figure 11:
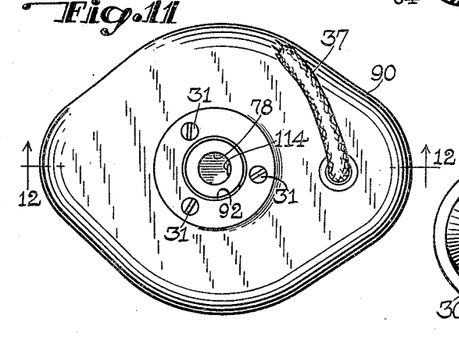
Fig. 11 is a top plan view of another form of the electric heater adapted for connection into the pipe that leads to the faucet.

The form of the heater shown in Figs. 11 to 14, inclusive is adapted to be connected into the pipe line which runs to the faucet rather than to the faucet itself as in the case of the form just described, and has a casing 64 of plastic or ceramic material, in which a group of heating plates similar to those already described is suspended by binding posts 25, 26 from an inner cover 65 held by anchoring screws 30 to the casing upon gasket 28, all the plates 23, 24, 41 and 47, as well as binding posts 25, 26 being the same as in the heater of Figs. 1 to 5, except for the bottom plate 66, which differs from bottom plate 67 in Figs. 2 and 3 as well as Fig. 7 by being extended to reach vertical equalizing slot 68 beneath the crescent-shaped extension 69 of heating chamber 70 occupied by the plates. The inner cover 65 has a contact adjusting screw 38 and a central hub 71 with an internal thread 72 for receiving the threaded end of a pipe leading to the faucet (not shown) and a switch 73 recessed into the cover having a sensitive micro-contact 74 operated by a bimetallic member 75 which presses upon said contact button 74 when a predetermined high temperature has been reached by the water flowing up from heating chamber portion 76 and through passage 77 toward upward outlet port 78 in the hub. The horizontal passage 77 extends wholly into inner cover 65 over top plate 41.

Figure 21:
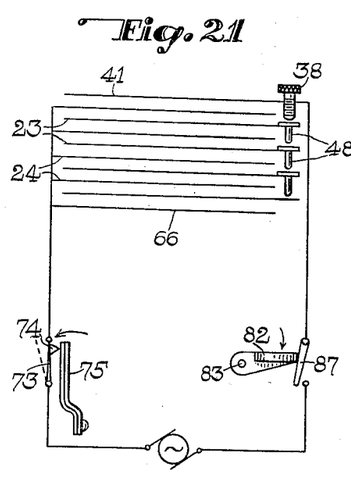
Fig. 21 is also a circuit diagram of the heater of Figs. 11 to 14.
Figure 22:
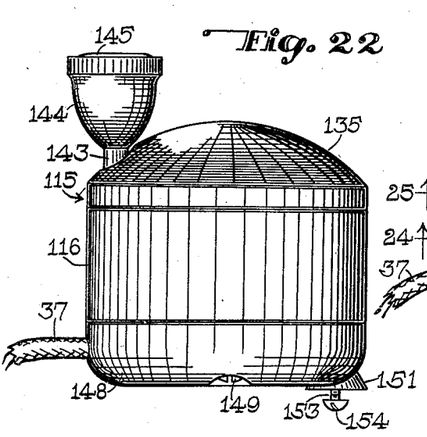
Fig. 22 illustrates in elevation another form of electric water or fluid heater.

In this form of heater, the water enters lower hub 79 from a water supply pipe (not shown) screwed into thread 80, through screen 81, raising cover or lid 82 hinged at 83 against spring 84, causing cam portion 85 of said lid to press upon button 86 of a second switch 87. Both switches are included in the heater circuit as indicated in the diagram of Fig. 21, switch 73 opening the circuit when operated by bimetallic member 75, but switch 87 closing the circuit when operated by lid 82 upon entry of water into the heater from within hub 79. When the water passes lid 82 it flows through bottom passage 88 to the vertical end passage 89 and then through equalizing slot 68 into distributing portion 69 of heating chamber 70. In the latter the water passes between the heating plates 23, 24, 41, 47 and 66 to outlet portion 76 thereof and then into upper passage 77 to outlet port 78 and then out through the pipe (not shown) leading to the faucet which, by the operation of lid 82 and switch 87 virtually controls the operation of the heater. Thus, the opening of the faucet or the like allows water from the main to flow through the apparatus, automatically operating switch 82 and closing the circuit so that the plates act to heat the water while element 75 and its associated micro-switch 73 prevent overheating by cutting off the current above a given temperature.

The adjusting screw and the features of the plates co-operating therewith are in all particulars similar to the corersponding adjusting screw and plates in Figs. 1 to 5, so that their operation need not be repeated here. Also the outer cover 90 fits over inner cover 65 and is secured to the latter by the central group of screws 31, while ribs 91 provide space for adjusting screw 38 and the terminals of posts 25 and 26 with the cable connections thereto. Loosening the last mentioned screws to release outer cover 90 will enable the operator to raise said cover up along the upper pipe in thread 72 for access to the adjusting screw 38 and the cable connections, etc., the outer cover having a clearance hole 92 through which the mentioned upper pipe passes freely, allowing the cover to be raised as mentioned. It is evident that in this form of the heater it is also readily possible to adjust the amount of plate surface in contact with the water to be included in the circuit.

Figure 15:
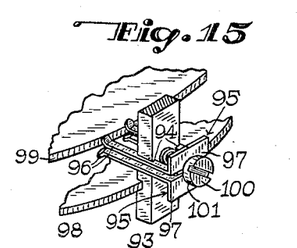
Fig. 15 is a fragmentary perspective view of a modified form of adjustable contact for cutting in or out a plate in the circuit.
Figure 16:
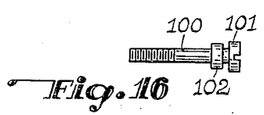
Fig. 16 is the adjusting screw of the device of Fig. 15.
Figure 17:
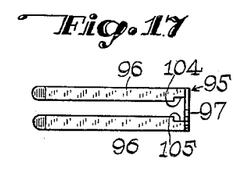
Figure 18:
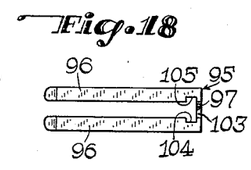
Figure 19:
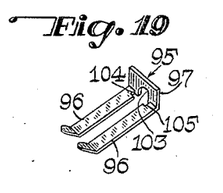
Fig. 19 is a perspective view of the same member.

It has already been shown that an adjusting screw may be used to depress an integral tongue upon a metal plate and thereby make contact with said plate and even make further contact with a plate beneath, but it is feasible to use an adjusting screw in a somewhat different manner to cut out or introduce a plate into the heating circuit, as even indicated in Fig. 15. Here, a metal post 93 has a pair of bifurcated contact members straddling the same slidably in side slots 94, each contact member 95 having a pair of parallel resilient contact fingers 96, 96 interconnected by an end piece 97 bent down at an angle to said fingers. To the post is fixed one plate 98, for example, (no plate of opposite polarity being shown) while a further plate 99 is shown without actual contact with the mentioned post. The latter has a screw 100 screwed partly into it with a pair of flanges 101, 102 engaging upon the outer and inner sides of the end pieces 97, 97 of the contact members 95 and a cutout clearance portion 103 in each engaging upon the screw between the flanges and the contact members further having inner clearance portions 104, 105 in the fingers to accommodate screw flange 102. When the screw is rotated to screw the same further into the post 93, the flanges engaging against the end piece 97 of the contact members will cause the same to slide inward toward plate 99 until the fingers of both members will frictionally slide in upon and engage with said plate. The latter will then be connected into the heating circuit with plate 98 and post 93. Obviously, turning the screw in the opposite direction will remove the contact fingers from active electrical contact with plate 99 so as to remove the plate from the active circuit. Other means may of course be used for connecting certain plates into or out of the heater circuit, if desired.

In both forms of the heater, the means for controlling the amount of plate surface actually passing current through the water to some extent controls the heating effect of the current, as already intimated. However, a definite means for controlling the temperature of the water delivered by the apparatus is included to allow adjustment for seasonal changes in the temperature of the water arriving to the heater from the water mains. Obviously, the water in the latter is colder in winter than in summer and in one locality in contrast with another.

The means thus included are in principle the same in both forms of heater, but in the faucet type of Fig. 1, a thermometer 106 is cemented or otherwise secured in the external recess 107 in casing 22, with the bulb 108 thereof registering with an aperture 109 in the wall of said casing serving to communicate to the bulb the temperature of the water within flowing toward the spout.

It is quite evident that if the water is allowed to pass swiftly through the heater, it will not be heated to the highest possible temperature, but if impeded by back pressure, it will issue at a slower rate and will be longer in contact with the plates and thus heated to a higher temperature. Hence, the perforate spout plate 59 is provided with a manually adjusted screw 110 terminating at the top in a valve head 111 adapted to close to a greater or less extent aperture 112 leading to the spout from passage 57 and thereby produce a back pressure impeding the flow of the water to just the right degree to obtain the desired temperature at the spout.

Figure 12:
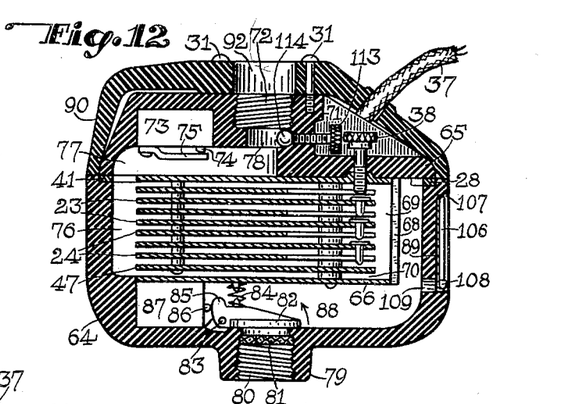
Fig. 12 is a vertical central section of the latter heater as taken on line 12—12 in Fig. 11.
Figure 13:
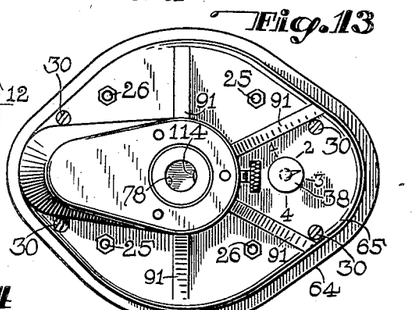
Fig. 13 is also a top plan view similar to Fig. 11 with the upper cover removed or raised out of the way to reveal the second or lower cover.
Figure 14:
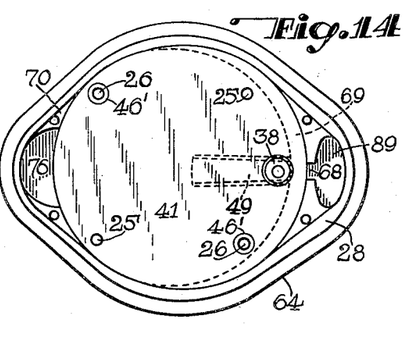
Fig. 14 is a similar view with both covers removed to disclose the interior of the heater.

In the other form of the heater of Fig. 12, the thermometer 106 is the same as already described, which is likewise true of recess 107, bulb 108 and aperture 109 in casing 64. On the other hand, the adjusting screw 113 extends through the side of hub 71 with the valve head 114 thereof adapted to be projected more or less into the path of the water flowing upward through passage 70 to produce the necessary amount of back pressure on the water to produce the desired temperature of the water delivered by the heater. In this form of heater it is to be noted that both adjusting screws 38 and 113 are protected by the outer cover 90 which upon removal allows access to either or both screws for occasional adjustments, when required.

In Figs. 22 to 27, inclusive, another form of the heater is illustrated to bring out the variation possible with respect to some of the features already described. For example, in the foregoing forms, the fluid flows through the plate stack in general parallelism between all of the plates simultaneously, but the water may also flow through a sinuous path between two plates at a time and thus traverse a long path, as will be described in connection with the mentioned last six figures. Also in the previously mentioned forms, the heater casing has an inner cover forming a closure therefor and then an outer cover over said inner cover, but in the last mentioned Figures 22 to 27, the closure cover is alone upon one portion of the casing, whereas the other cover is secured upon the opposite end of the same casing to protect the electrical connections.

Figure 24:
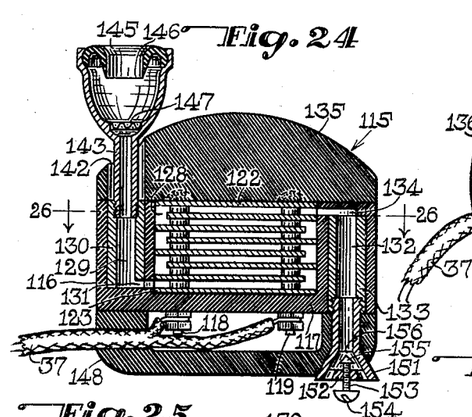
Fig. 24 is a vertical section of the heater as taken on line 24—24 in Fig. 23.
Figure 25:
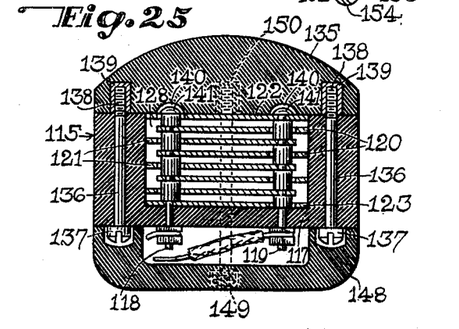
Fig. 25 is another vertical section of the same heater as taken on line 25—25 in Fig. 23.

Thus, in said views, the heater, generally indicated at 115 has a casing 116 of insulating material provided with a bottom 117 to which the binding posts 118, 119 are secured (Figs. 24 and 25). The binding posts serve to support a stack of plates 120, 121 as well as top plate 122 and bottom plate 123 in proper alternation, plates 120 and 123 being of one polarity and secured both mechanically and electrically to posts 118 at diagonally opposite corners, while the other corners are provided with clearances 124, 125 to avoid contact with posts 119 which are of opposite polarity. These latter posts are mechanically and electrically connected to plates 121 and 122 which have corner cutouts 126, 127 to avoid contact with posts 118.

It is to be noted that the plate stack occupies a chamber 128 in casing 116, with top plate 122 and bottom plate 123 of the same length for a reason that will shortly appear, while plates 120 are short and disposed toward the right end of chamber 128 and plates 121 likewise short and displaced toward the left end of the chamber.

Figure 23:
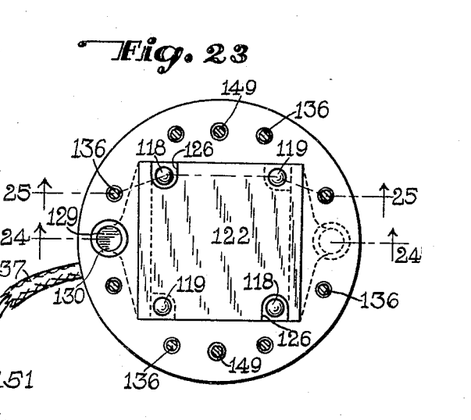
Fig. 23 is a top or plan view of the latter heater with the upper or outer cover removed to reveal interior detail.
Figure 26:
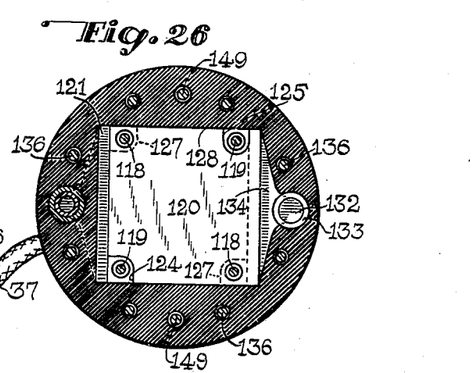
Fig. 26 is a transverse section taken on line 26—26 in Fig. 24.
Figure 27:
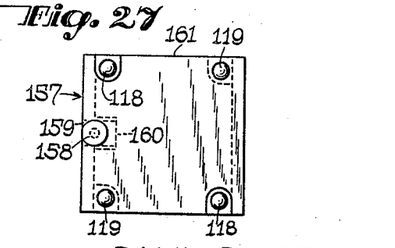
Fig. 27 is a plan view of the plate stack of the heater shown substantially in the same position as in Figs. 23 and 26.

When viewing Fig. 24 with Figs. 23 and 26, it will be seen that a vertical passage 129 in the casing is reinforced by an inserted metal tube 130 slotted at the bottom at 131 so as to connect with the space between the bottom plate 123 and the lowest plate 121. In similar fashion, the upright passage 132 at the right is reinforced by a metal tube 133 inserted in the wall of the casing and connects at the top with horizontal passage 134 which communicates directly with the space between top plate 122 and the uppermost plate 120. As the latter plate is spaced from the left end of chamber 128, the mentioned space communicates with the space immediately below between uppermost plate 120 and the uppermost plate 121 which is spaced from the right end of said chamber. In the same way the last mentioned space communicates with the third space from the top between the upper plate 121 and the second plate 120, and so on down to the bottom space which communicates with the slot 131 and passage 129 in tube 130, with the result that there is a sinuous passage formed in the plate stack reaching from one tube passage 129 to passage 132.

Upon the casing is mounted a massive dome shaped cover secured at 135 by a plurality of short bolts or machine screws 136 having their heads 137 bearing against the bottom 117 of the casing and the threaded ends 138 engaging in internally threaded reinforcing sleeves 139 in the cover. The latter has clearance portions 140 for accommodating the upper ends 141 of the binding posts, its otherwise heavy construction being designed to make the cover rigid to effectively withstand considerable pressures from within the apparatus even under heat. In the left side of the cover is a clearance passage 142 or hole for the stem 143 of a faucet fitting 144 provided with a resilient faucet nipple 145 retained in the fitting and formed with a re-entrant portion 146 as in the case of nipple 33 already described for gripping about a faucet when water under pressure is passing through said nipple. The latter may be cemented or otherwise secured in the fixture in known manner. The stem is screwed into the upper end of tube 130 embedded in the casing 116 while within the fixture is a screen filter which is usual in devices of this type, as shown at 147, being effective to remove rust clots and grains or particles of matter which might short circuit the plates. As the cover is massive and for all purposes strong enough to form the top closure for the casing without reinforcement, the second cover is not placed over it, but instead the cover 148 is attached to the bottom of said casing by two oppositely located screws 149 which extend through the casing and into the cover 135 in which each of said screws engages in a threaded sleeve 150. The lower cover serves to conceal and protect the binding post terminals and connections of cable 37 which passes out through an aperture in the side thereof, the release of said two screws freeing said lower cover 148 without disturbing the upper cover 135 or its retaining screws 136, allowing access to the connections when required.

To the lower end of tube 133 at the right (Fig. 24) a delivery spout 151 is secured by screwing the upper end of the latter into said tube through a portion of the lower cover, said spout being flaring at the bottom and having a strainer plate fixed therein at 152. In the latter is inserted a screw 153 having a head 154 at its lower accessible end and at its upper end a valve head 155 adapted to partially close the opening 156 in said spout, according to the degree to which the screw 154 is turned. If said screw is screwed far up into the spout, the opening will be almost closed so as to exert a considerable back pressure on the water passing through the casing and thereby delaying its passage between the plates, with the result that the water will be heated to a very high temperature before it issues. If the screw is turned only part of the way up so that less back pressure is exerted on the water in said casing, the water will, of course flow a little more rapidly through its sinuous path between the plates in series and be heated to a somewhat lower temperature, the latter thus being adjustable at will by adjusting screw 154 until the desired temperature is obtained.

In this form of the heater, it is obvious that the water will travel much longer in contact with the plates than in the two forms already described because of the sinuous path taken by the water in passing through the apparatus, while in the forms of Figs. 1 to 5 and 11 to 14 the water passes between all the plates in a plurality of parallel streams simultaneously and the water therefore travels more rapidly through the apparatus, except as impeded by the adjustable screws 110, 113 as already explained.

Although no means for cutting in or out some of the plates has been shown in Figs. 22 to 26, Fig. 27 illustrates how a stack of plates of the last described type at 157 may be provided with a control screw 158 capable of depressing tongues 159 in the long plates beneath while the short plates at the same end have the clearance slots 160 to avoid contact with said tongues during adjustment. The details of such plates in respect to the adjustment of the control screw and the tongues and contact pins, etc., are otherwise as already shown in connection with plates 23 and 24 in the previously described forms of the heater. On the other hand, the form of adjustment for cutting in or out some of the plates with respect to the active circuit may also be performed by the screw 100 and its associated contact members 95 engaging the sides 161 of the plates in Fig. 27 as detailed in Fig. 15, if so desired. In that case, the screw 158 and tongues 159 would naturally be omitted as superfluous.

From the foregoing it is manifest that the heater may be varied in form, may have parallel or sinuous paths for the water to be passed through the same, and may have various means for cutting out or cutting in one or more plates with respect to the circuit, and may also have two covers, either superposed in mutual relation or located on opposite ends of the heater casing, while the outlet port is capable of adjustment for determining the length of time the water travels in contact with the plates to determine the temperature of the water delivered at the spout. Hence, not only variations may be resorted to, but parts may be used without others, as desired, within the scope of the appended claims.

Having now fully described my invention, I claim:

1. An electric fluid heater, comprising a container having a fluid inlet port and a fluid outlet port, a group of conducting plates spaced apart to form a series within said container with each plate insulated from the next adjacent plate in the series, means for connecting alternate plates to a conductor, means for connecting at least one of the other plates to another conductor of different polarity than that of the first mentioned conductor, a manually adjustable member for bringing one or more of the other plates into the circuit with said other conductor, at will in order to increase the active area in contact with the fluid flowing through the heater, flexible contact lugs upon said other plates disposed in the path of said manually adjustable member, said alternate plates connected to the first mentioned conductor being formed with cut out clearance portions preventing contact of said contact lugs with said alternate plates when the adjustable member flexes the lugs into mutual contact to introduce said plates having the lugs into the circuit, and means for supporting all of the plates in fixed position within said container.

2. An electric fluid heater including a casing, a plurality of metal plates of opposite polarity spaced apart in an alternating series, means for supporting the plates within the casing, an inlet port and an outlet port, a removable cover for said casing, means associated with the casing for controlling the temperature of the fluid issuing from said outlet port, including a manually adjustable member accessible upon a portion of the heater to adjust the amount of fluid delivered thereby during operation, and a thermometer mounted upon the exterior of said casing in a postion for reading the temperature of the fluid flowing toward the outlet port, an aperture in the wall of the heater communicating the heat of said fluid to said thermometer at all times.

3. An electric fluid heater including a casing, a plurality of electrically conducting plates of mutually opposite polarity spaced apart in an alternating series, a removable cover for the casing, means for supporting the plates within said casing, said means comprising binding posts and an inner cover for the casing to which said binding posts are secured, the binding posts upon said inner cover supporting all of the plates of both polarities, an inlet port and an outlet port, and means associated with the casing for controlling the temperature of the fluid issuing from said outlet port, said inner cover being located in a position to be covered and concealed by the removable cover and having exterior reinforcing ribs providing spaces therebetween for connections to said binding posts upon the outer surface of the inner cover within said removable cover.

4. An electric fluid heater including a plurality of electrically conductive plates or electrodes adapted to be directly exposed to a fluid to be heated by electric current passing between said plates, means including connecting members of opposite polarity rigidly associated with said plates and dividing them into groups among which at least two plates are individually connected directly to two connecting members, one or more electrically conductive plates isolated from said connecting members, adjustable means for bringing said isolated plates individually into the heater circuit with one of said first mentioned plates and connecting members at will.

5. An electric heater according to claim 4, wherein the means for bringing the isolated plates into the heater circuit includes an adjusting screw accessible upon the heater, contact means within the latter capable of being shifted by rotation of said screw to bring at least one of said isolated plates into said circuit by connection with one of the connecting members and also of being cut out of the circuit by reverse rotation of said screw.

6. An electric heater according to claim 4, wherein a casing is included for containing the plates and is made of insulating material, and an insulating cover forms a support for the connecting members and plates, and wherein an outer cover also of insulating material is adapted to be secured upon said casing outside the first cover.

7. An electric fluid heater according to claim 4, wherein the means for bringing the isolated plates into the circuit with the connecting members include an adjustable screw accessible upon the heater, a contact finger upon at least one of said isolated plates extending into the path of said adjusting screw in a position adapting it to be brought into direct contact with a further isolated plate by the adjusting screw upon rotation thereof beyond a point at which it initially makes effective contact with the first mentioned isolated plate.

8. An electric fluid heater according to claim 4, wherein the means for bringing the isolated plates into the circuit with the connecting members include an adjustable screw accessible upon said heater, a contact finger upon each of several of said isolated plates in the path of the adjusting screw and provided with a projecting contact portion extending toward the next isolated plate in the series, said screw being adapted upon rotation thereof to be initially brought into contact with the first contact finger in the series and thereafter to bring said first contact finger into contact with the second in said series and also to break the contact between said screw and first finger and between the fingers upon reversing rotation of the screw.

9. An electric fluid heater according to claim 4, wherein a casing is included for the plates as well as a nipple for connecting the heater to a faucet, said heater having a spout, a depressed passage portion within the casing beyond the plates forming a sedimentation well in the path of the fluid flowing from said plates toward said spout, an upright partition above said well forming a rising passage beyond said partition, a second upright partition spaced within the casing from the first mentioned partition in parallelism with the latter and terminating short of the top of the casing but connecting with said casing at the bottom to form a downward passage beyond said second partition opening downward to form an outlet port in said spout, and removable cover means for supporting said plates in said casing.

10. In an electric fluid heater including an insulate container having a stack of spaced conducing plates of alternate polarities within the container, in which stack the plates are staggered toward first the one end and then toward the other end of the interior of said container to present a sinuous path for the fluid between the mutually adjacent pairs of plates from the upper end to the bottom of the stack, the feature which includes a top plate and a bottom plate respectively spaced above and beneath said stack to constitute the top and bottom plates therefor, both top and bottom plates being longer than the staggered plates and occupying the full length of said interior, there being an inlet port in said container leading to the space between the top plate and the second plate from the top and an outlet port in said container leading from the space between the bottom plate and the second plate from the bottom.

11. An electric fluid heater including an insulate container having side walls and a bottom, a stack of conducting plates disposed within the container and supported in alternation with each plate insulated from the next adjacent plate in the stack, binding posts supporting said plates and extending through said bottom for making connections with an outside source of current, a cover for said bottom for protecting the portions of said binding posts extending thru said bottom and cable connections thereto, an inlet port for fluid leading to the interior of said container and an outlet port leading from said interior, a fluid passage extending directly downward in the side wall of said container from the inlet port to the bottom of the interior containing said plates, a second or outlet passage for fluid extending directly upward from the exterior outlet port in the side wall of said container to the upper portion of the same interior of said container, and a second cover for the container for covering the mentioned interior, said second cover having a massive intermediate cross section to reinforce the same against high internal fluid pressure and heat developed within said container, the two covers being independently secured to the opposite ends of the container.

12. An electric fluid heater comprising a container having the interior thereof occupied by a plurality of spaced plates, means connecting some of the plates to a conductor of one polarity, means connecting one or more of the other plates to another conductor of opposite polarity, and means for selectively connecting one or more of the remaining plates to the second conductor including flexible portions upon the latter plates and a screw in a portion of said container directed against the flexible portion of one of the latter plates and capable of bringing said flexible portion into contact with a corresponding flexible portion of the next plate of said remaining plates to cut the latter plate into the circuit at will, there being clearance portions in adjacent plates connected to the first mentioned conductor for preventing said flexible portions of the other plates making accidental contact with said adjacent plates.

13. An electric fluid heater including an insulate container having a stack of spaced conducting plates supported therein in alternation with each plate insulated from the next adjacent plate in the stack, means for bringing electric current to said plates in predetermined manner, an inlet port and an outlet port for fluid leading to the interior of the container, said means comprising binding posts projecting through the bottom of said container, a cover for the bottom to cover said binding posts, a cover for the interior of the container having a massive intermediate cross section for reinforcing the same against internal expansion, said two covers being independently secured to the two opposite ends of said container, means for providing a sinuous fluid passage between the plates to prolong contact of the fluid with the plates, and means for cutting in or cutting out one or more plates of one polarity from the circuit, an externally accessible screw member being capable of operating said last mentioned means.

14. An electric fluid heater according to claim 10 having adjustable means for cutting in or cutting out one or more plates of one polarity from the circuit, together with an accessible adjusting member covered by one of the covers for adjusting said adjustable means at will, and adjusting means associated with the outlet port for impeding the delivery of fluid from said port to any desired extent in order to delay the flow of fluid through the apparatus and thereby prolong the contact of the fluid with the plates within said container.

PAUL P. HORNI.

REFERENCES CITED

The following references are of record in the file of this patent:

UNITED STATES PATENTS

| Number | Name | Date |
| --- | --- | --- |
| 957,667 | Fuller | May 10, 1910 |
| 1,191,743 | Simon | July 18, 1916 |
| 1,707,322 | Scanlan | Apr. 2, 1929 |
| 1,764,139 | Allex | June 17, 1930 |
| 1,847,198 | Torrisi | Mar. 1, 1932 |
| 1,916,064 | Mortensen | June 27, 1933 |
| 1,920,284 | Wells | Aug. 1, 1933 |
| 1,952,107 | Wilson | Mar. 27, 1934 |
| 1,957,070 | Ludwig | May 1, 1934 |
| 1,967,011 | Pargman | July 17, 1934 |
| 2,355,687 | Van Hise | Aug. 15, 1944 |

FOREIGN PATENTS

| Number | Country | Date |
| --- | --- | --- |
| 718,051 | France | Oct. 27, 1931 |
| 496,155 | Great Britain | Nov. 25, 1938 |